US012231846B2

(12) United States Patent
Kim et al.

(10) Patent No.: US 12,231,846 B2
(45) Date of Patent: Feb. 18, 2025

(54) ELECTRONIC DEVICE AND METHOD OF OPERATING THE SAME

(71) Applicant: Samsung Electronics Co., Ltd., Suwon-si (KR)

(72) Inventors: Choonho Kim, Suwon-si (KR); Gangyoul Kim, Suwon-si (KR); Kitae Kim, Suwon-si (KR); Mooyeol Kim, Suwon-si (KR); Mihyang Kim, Suwon-si (KR); Taebin Kim, Suwon-si (KR); Yuhoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 18/149,930

(22) Filed: Jan. 4, 2023

(65) Prior Publication Data

US 2023/0156399 A1 May 18, 2023

Related U.S. Application Data

(63) Continuation of application No. PCT/KR2022/017815, filed on Nov. 14, 2022.

(30) Foreign Application Priority Data

Nov. 15, 2021 (KR) ........................ 10-2021-0157020
Jan. 13, 2022 (KR) ........................ 10-2022-0005476

(51) Int. Cl.
*H04R 1/40* (2006.01)
*G10K 11/16* (2006.01)
(Continued)

(52) U.S. Cl.
CPC ............. *H04R 1/406* (2013.01); *G10K 11/16* (2013.01)

(58) Field of Classification Search
CPC .................... H04R 1/406; G10K 11/16; G10L 2021/02166; G10L 21/0208
(Continued)

(56) References Cited

U.S. PATENT DOCUMENTS 8,660,281 B2 2/2014 Bouchard et al.
9,344,796 B2 5/2016 Ganeshkumar et al.
(Continued)

FOREIGN PATENT DOCUMENTS

KR 10-2017-0022727 A 3/2017
KR 10-2019-0097473 A 8/2019
(Continued)

OTHER PUBLICATIONS

International Search Report dated Feb. 23, 2023, issued in an International Application No. PCT/KR2022/017815.

*Primary Examiner* — Thjuan K Addy
(74) *Attorney, Agent, or Firm* — Jefferson IP Law, LLP

(57) ABSTRACT

An electronic device including a plurality of microphones and a processor is provided. The electronic device includes a plurality of microphones disposed at different positions in the electronic device, a processor configured to collect input signals input to each of the microphones, acquire direction of arrival (DOA) information corresponding to each of the microphones from the input signals, calculate generation directions of the input signals using the DOA information, adjust a weight of an input signal for each of the microphones, based on the generation directions of the input signals, and generate an output signal for each of the microphones by reflecting the weight adjusted for each of the microphones, and a speaker configured to output an output signal for each of the microphones.

20 Claims, 9 Drawing Sheets

(51) Int. Cl.
*G10L 21/0208* (2013.01)
*G10L 21/0216* (2013.01)

(58) Field of Classification Search
USPC ............................... 381/66, 300, 310, 309, 1
See application file for complete search history.

(56) References Cited

U.S. PATENT DOCUMENTS

| | | | |
|---|---|---|---|
| 9,525,938 B2 | 12/2016 | Deshpande et al. | |
| 10,347,235 B2 | 7/2019 | Oppenheimer et al. | |
| 2019/0103113 A1* | 4/2019 | LaBosco ............. | G10L 21/0208 |
| 2019/0341026 A1 | 11/2019 | Visser et al. | |
| 2019/0348056 A1 | 11/2019 | Christoph | |
| 2021/0029443 A1* | 1/2021 | Liu ...................... | H04R 1/1075 |

FOREIGN PATENT DOCUMENTS

| | | |
|---|---|---|
| KR | 10-2020-0090553 A | 7/2020 |
| KR | 10-2150013 B1 | 8/2020 |

* cited by examiner

600

| | First microphone | Second microphone | Third microphone |
|---|---|---|---|
| Front (0 degrees) | 45% | 45% | 10% |
| +30/-30 | 50% | 40% | 10% |
| +45/-45 | 60% | 30% | 10% |
| +60/-60 | 70% | 20% | 10% |
| +90/-90 | 80% | 10% | 10% |

FIG.6

ELECTRONIC DEVICE AND METHOD OF OPERATING THE SAME

CROSS-REFERENCE TO RELATED APPLICATION(S)

This application is a continuation application, claiming priority under § 365(c), of an International application No. PCT/KR2022/017815, filed on Nov. 14, 2022, which is based on and claims the benefit of a Korean patent application number 10-2021-0157020, filed on Nov. 15, 2021, in the Korean Intellectual Property Office, and of a Korean patent application number 10-2022-0005476, filed on Jan. 13, 2022, in the Korean Intellectual Property Office, the disclosure of each of which is incorporated by reference herein in its entirety.

BACKGROUND

1. Field

The disclosure relates to an electronic device and a method of operating the electronic device.

2. Description of Related Art

During a call using an electronic device, a noise signal and/or an echo signal may be generated due to various causes other than a speaker's voice. Since these noise signals and/or echo signals may affect call quality and degrade performance, robustness may be acquired by removing the noise signals and/or echo signals.

The above information is presented as background information only to assist with an understanding of the disclosure. No determination has been made, and no assertion is made, as to whether any of the above might be applicable as prior art with regard to the disclosure.

SUMMARY

A noise signal may be categorized into a diffuse noise signal without direction of arrival (DOA) information and an interference noise signal with DOA information. Among them, a diffuse noise signal without DOA information may be removed by beamforming, but an interference noise signal with DOA information, such as a voice of a person nearby or a sound of a television (TV) drama show, cannot be removed.

Accordingly, an aspect of the disclosure, it is to efficiently remove a directional noise signal other than a speaker's voice signal during a video call by using an electronic device with DOA information.

Another aspect of the disclosure is to improve performance degradation due to mounting positions of microphones in an electronic device.

Another aspect of the disclosure is to lessen performance degradation due to an echo signal in an electronic device.

In accordance with an aspect of the disclosure, an electronic device is provided. The electronic device includes a plurality of microphones disposed at different positions in the electronic device, a processor configured to collect input signals input to each of the microphones, acquire DOA information corresponding to each of the microphones from the input signals, calculate generation directions of the input signals using the DOA information, adjust a weight of an input signal for each of the microphones, based on the generation directions of the input signals, and generate an output signal for each of the microphones by reflecting the weight adjusted for each of the microphones, and a speaker configured to output an output signal for each of the microphones.

In accordance with another aspect of the disclosure, a method of operating an electronic device including a plurality of microphones is provided. The method includes collecting input signals input to each of the microphones at different positions in the electronic device, acquiring DOA information corresponding to each of the microphones from the input signals, calculating generation directions of the input signals using the DOA information, adjusting a weight of an input signal for each of the microphones, based on the generation directions of the input signals, generating an output signal for each of the microphones by reflecting the weight adjusted for each of the microphones, and outputting an output signal for each of the microphones.

An electronic device according to one embodiment may remove directional noise other than the speaker's voice signal by using DOA information corresponding to the plurality of microphones.

An electronic device according to one embodiment may adjust the weight of the input signal for each microphone with respect to the signal generated in a direction other than the speaker, according to the generation direction of the input signals calculated based on DOA information corresponding to the plurality of microphones. Call quality may be improved by further removing interference noise.

An electronic device according to one embodiment may determine whether an echo signal is included in the input signal based on the echo reference information and remove DOA information of the echo signal to acquire DOA information corresponding to the speaker's voice signal, and accordingly, performance degradation due to echo signals may be lessened.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating an example of a weight table according to an embodiment;

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
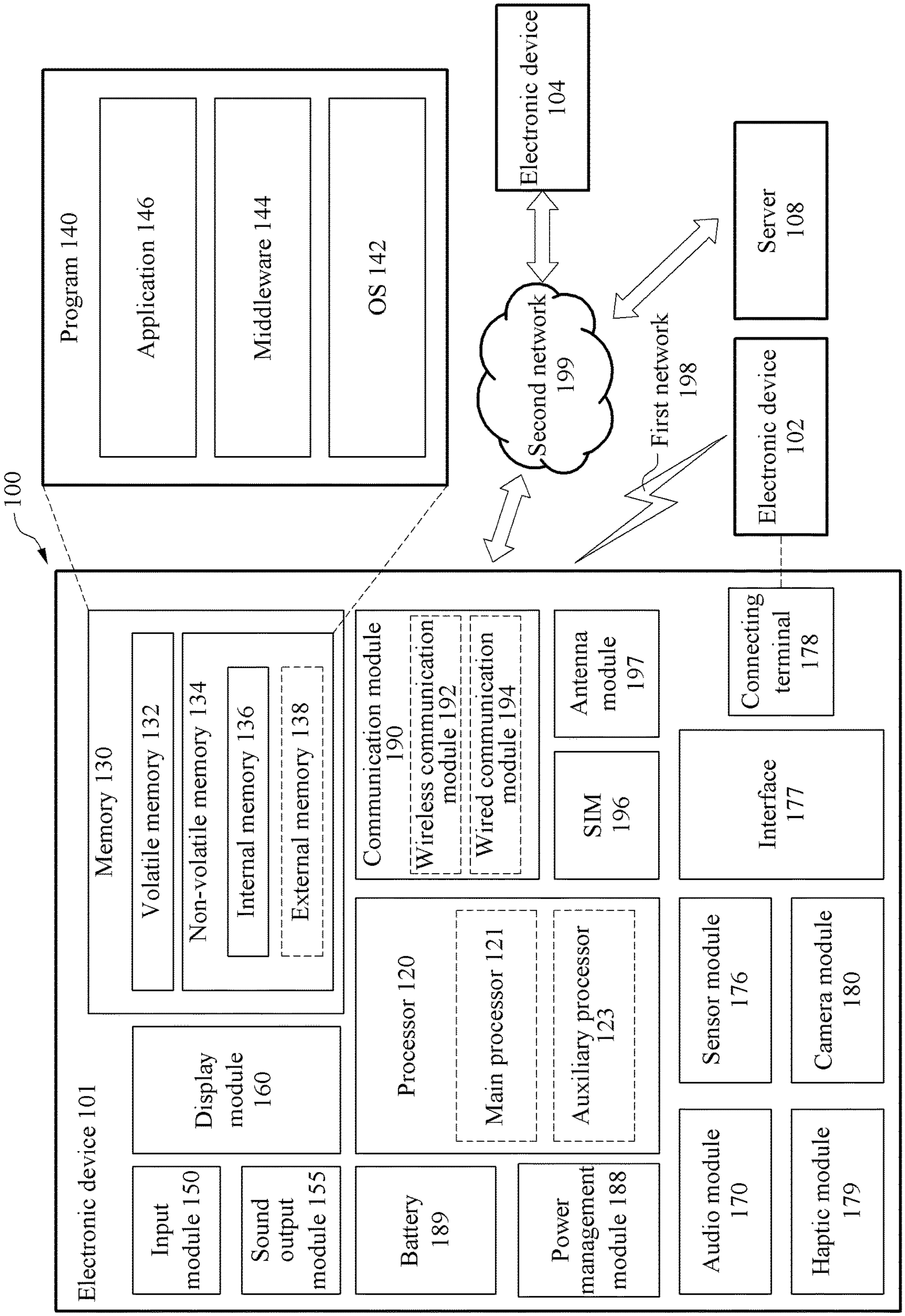
FIG. 1 is a block diagram illustrating an example electronic device in a network environment according to an embodiment of the disclosure.

FIG. 1 is a block diagram illustrating an electronic device in a network environment according to an embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a motor 187, a power management module 188, a battery 189, a communication module 190, a subscriber identification module (SIM) 196, or an antenna module 197. In one embodiment, at least one of the components (e.g., the connecting terminal 178) may be omitted from the electronic device 101, or one or more other components may be added to the electronic device 101. In one embodiment, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to one embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. Non-volatile memory 134 may include internal memory 136 and external memory 138.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to one embodiment, the display module 160 may include a touch sensor adapted to detect a touch, or a pressure sensor adapted to measure the intensity of force of the touch.

The audio module 170 may convert sound into an electric signal or vice versa. According to one embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to one embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, and flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an application processor (AP)) and that support direct (e.g., wired) communication or wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter (mm) Wave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101.

According to one embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In one embodiment, the external electronic device (e.g., the electronic device 104) may include an Internet-of-things (IoT) device. The server 108 may be an intelligent server using machine learning and/or a neural network. According to one embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
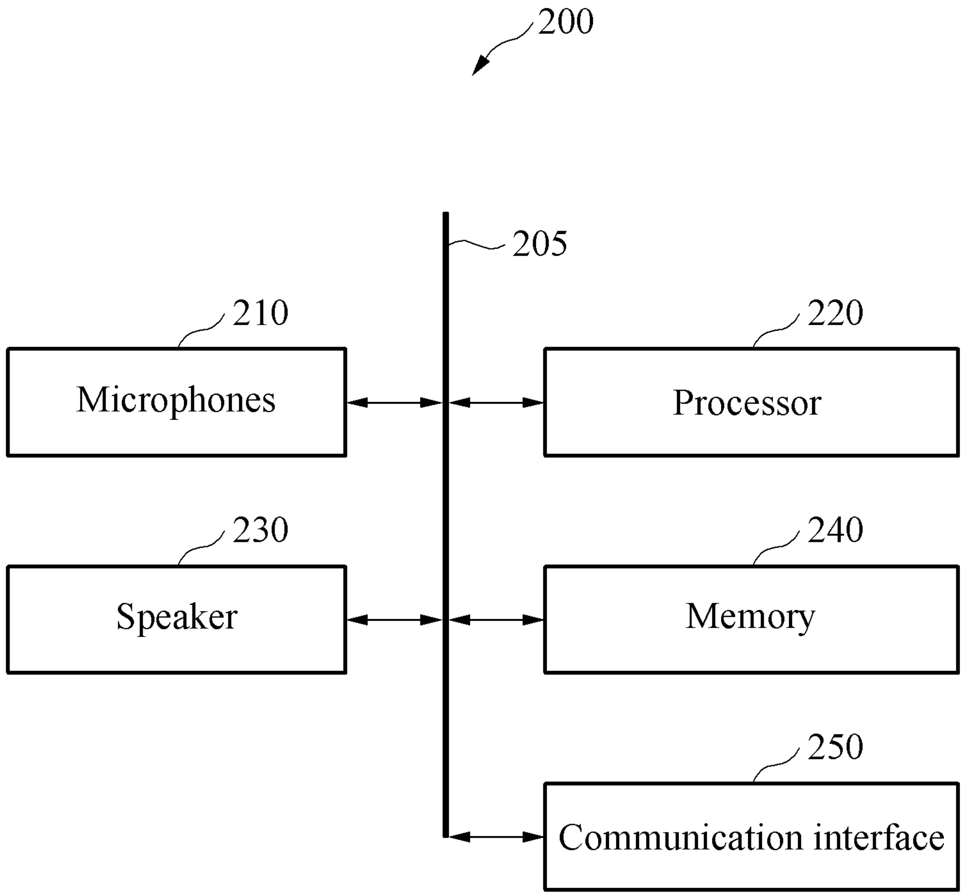
FIG. 2 is a block diagram illustrating an electronic device according to an embodiment.

FIG. 2 is a block diagram illustrating an electronic device according to an embodiment.

Referring to FIG. 2, an electronic device 200 (e.g., the electronic device 101 of FIG. 1) may include a plurality of microphones 210 (e.g., the input module 150 of FIG. 1), a processor 220 (e.g., the processor 120 of FIG. 1), a speaker 230 (e.g., the sound output module 155 of FIG. 1), a memory 240 (e.g., the memory 130 of FIG. 1), and a communication interface 250 (e.g., the communication module 190 of FIG. 1). The plurality of microphones 210, the processor 220, the speaker 230, the memory 240, and the communication interface 250 may communicate with each other via, for example, a communication bus 205, or the microphones 210, the processor 220, the speaker 230, the memory 240, and the communication interface 250 may communicate with each other via an Internet protocol (IP) assigned thereto.

The plurality of microphones 210 may be disposed at different positions in the electronic device 200 to receive input signals. Different positions where the plurality of microphones 210 are disposed may include, for example, a first position on an upper end and/or a lower end of a front surface of the electronic device, a second position on a left side and/or a right side of the electronic device, and a third position on an upper end and/or a lower end of a rear surface of the electronic device, but are not necessarily limited thereto. A microphone at the first position among the plurality of microphones 210 may be referred to as a "first microphone," and a signal input to the first microphone may be referred to as a "first input signal." A microphone at a second position among the plurality of microphones 210 may be referred to as a "second microphone," and a signal input to the second microphone may be referred to as a "second input signal." A microphone at the third position among the plurality of microphones 210 may be referred to as a "third microphone," and a signal input to the third microphone may be referred to as a "third input signal." The number of microphones 210 may be, for example, three or more, but is not limited thereto.

The processor 220 may collect input signals input to each of the microphones 210. The processor 220 may acquire direction of arrival (DOA) information corresponding to each of the microphones 210 from the input signals. The processor 220 may calculate generation directions of the input signals using the DOA information. A method by which the processor 220 calculates the generation directions of the input signals using the DOA information will be described in more detail with reference to FIG. 4 below.

The processor 220 may adjust a weight of an input signal for each of the microphones 210, based on the generation directions of the input signals. For example, based on the generation directions of the input signals, the processor 220 may correct a weight of an input signal generated in a direction other than a position of a speaker (e.g., a speaker 501 of FIG. 5) corresponding to the electronic device 200 to be less than a reference value, and may correct a weight of an input signal generated in a direction corresponding to the position of the speaker 501 to be greater than the reference value. In this example, the "position of the speaker 501 corresponding to the electronic device 200" may be understood as, for example, a position where the speaker 501 looks at the front of a camera (e.g., the camera module 180 of FIG. 1) and/or a display module (e.g., the display module 160 of FIG. 1) disposed on the front surface of the electronic device 200 for a video call. The position of the speaker 501 corresponding to the electronic device 200 may be, for example, fixed, or changed.

In addition, the processor 220 may set a weight of a first input signal for a first microphone at a first position among the microphones 210 and a weight of a second input signal for a second microphone at a second position different from the first position to be identical, based on the generation directions of the input signals, when both the first input signal and the second input signal are generated in the direction corresponding to the position of the speaker 501 corresponding to the electronic device 200.

The processor 220 may generate an output signal for each of the microphones 210 by reflecting the weight adjusted for each of the microphones 210.

The processor 220 may calculate a direction in which sound is generated using DOA information of the microphones 210 at positions (e.g., a front upper end portion, a side, and a rear surface) other than the position (e.g., an central portion of the front surface) of the speaker 501 corresponding to the electronic device 200 and may adjust a weight of an input signal for each of the microphones 210 with respect to a signal generated in a direction other than the position of the speaker 501 based on the direction in which the sound is generated, to additionally remove interference noise, so that a call quality may be enhanced. A method by which the processor 220 generates an output signal for each of the microphones 210 will be described in more detail with reference to FIG. 5 below.

The processor 220 may adjust the weight of the input signal for each of the microphones 210 based on a weight table (e.g., a weight table 600 of FIG. 6) provided in advance for the microphones 210 corresponding to the generation directions of the input signals. The processor 220 may adjust a weight of an input signal of a second microphone based on a position of the second microphone, relative to the position of the speaker 501 corresponding to the electronic device in the weight table 600. In this example, the processor 220 may adjust a weight of an input signal for each microphone, based on the weight table 600 provided in advance for the microphones 210 corresponding to the generation directions of the input signals. An example in which the processor 220 generates an output signal by adjusting a weight of an input signal for each microphone using the weight table 600 will be described in more detail with reference to FIG. 7 below.

According to one embodiment, the processor 220 may determine whether an echo signal is included in the input signal. The "echo signal" may be understood to refer to a signal that is unintentionally and erroneously transmitted to a microphone although a signal received from a conversation partner needs to be transmitted to a speaker of an electronic device. In one embodiment, since the position of the speaker 230 is fixed, DOA information of the echo signal may also be fixed. The echo signal will be described in greater detail with reference to FIG. 8 below.

The processor 220 may determine whether an echo signal is included in the input signal based on echo reference information set in advance. The echo reference information may include information for recognizing in advance whether there is an echo signal in an input signal and which echo signal it is. The echo reference information may include, for example, at least one of an input time of the echo signal and DOA information of the echo signal, but is not limited thereto.

The processor 220 may determine whether an echo signal is included in at least one of the input signals, based on the echo reference information. When it is determined the echo signal is included in at least one of the input signals, the processor 220 may acquire DOA information corresponding to each of the microphones 210 by removing DOA information of the echo signal from a corresponding input signal. An example in which the processor 220 removes the echo signal from the input signal will be described in more detail with reference to FIG. 9 below.

The speaker 230 may output the output signal generated by the processor 220 for each microphone. For example, a single speaker, or a plurality of speakers 230 may be provided.

The memory 240 may store the DOA information corresponding to each of the microphones 210, acquired by the processor 220. The memory 240 may store the generation direction of the input signals calculated by the processor 220. Also, the memory 240 may store the output signal for each of the microphones 210 generated by the processor 220.

In addition, the memory 240 may store various pieces of information generated during the above-described processing operation of the processor 220. Also, the memory 240 may store various pieces of data and programs. The memory 240 may include, for example, a volatile memory or a non-volatile memory. The memory 240 may include a high-capacity storage medium, such as a hard disk, to store a variety of data.

According to one embodiment, the communication interface 250 may transmit, to the outside of the electronic device 200, DOA information corresponding to each of the microphones 210 calculated by the processor 220, the generation directions of input signals, and/or the output signal for each of the microphones 210 generated by the processor 220.

In addition, the processor 220 may perform at least one of the methods or operations described above with reference to FIGS. 1 to 9. The processor 220 may be a hardware-implemented electronic device having a circuit that is physically structured to execute desired operations. The desired operations may include, for example, code or instructions in a program. For example, the electronic device 200 implemented as hardware may include a microprocessor, a CPU, a GPU, a processor core, a multi-core processor, a multiprocessor, an application-specific integrated circuit (ASIC), a field-programmable gate array (FPGA), and an NPU.

Figure 3:
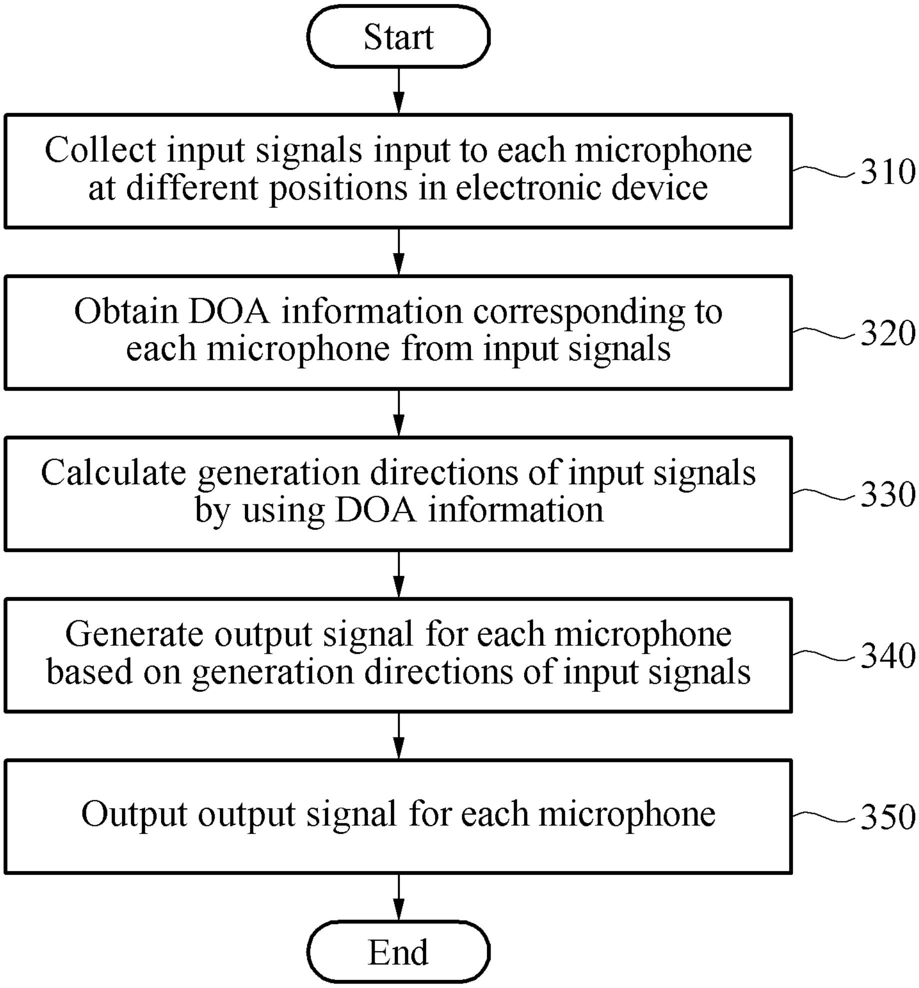
FIG. 3 is a flowchart illustrating a method of operating an electronic device according to an embodiment.

FIG. 3 is a flowchart illustrating a method of operating an electronic device, according to an embodiment. In one embodiment, operations may be sequentially performed, but are not necessarily performed sequentially. For example, the order of the operations may be changed and at least two of the operations may be performed in parallel.

Referring to FIG. 3, an electronic device (e.g., an electronic device 101 of FIG. 1 and an electronic device 200 of FIG. 2) including a plurality of microphones (e.g., an input module 150 of FIG. 1 and microphones 210 of FIG. 2) according to one embodiment may output an output signal for each microphone through operations 310 to 350.

In operation 310, the electronic device 200 may collect input signals input to each of the microphones 210 at different positions in the electronic device 200. The different positions may include, for example, a first position on an upper end of the front surface of the front surface of the electronic device 200, a second position on a side of the electronic device 200, and a third position on the rear surface of the electronic device 200, but are not necessarily limited thereto.

In operation 320, the electronic device 200 may acquire DOA information corresponding to each of the microphones 210 from the input signals collected in operation 310. The electronic device 200 may calculate DOA information corresponding to each of the microphones 210 by using, for example, a phase difference between signals input to the three or more microphones 210 at different positions. The electronic device 200 may determine whether an echo signal is included in the input signal. The electronic device 200, for example, may determine whether an echo signal is included in the input signal based on echo reference information set in advance. The echo reference information may include, for example, at least one of an input time of the echo signal and DOA information of the echo signal. When it is determined that the echo signal is included in at least one of the input signals, the electronic device 200 may remove DOA information of the echo signal from the corresponding input signal.

In operation 330, the electronic device 200 may calculate generation directions of the input signals using the DOA information. For example, during a video call, the electronic device 200 may predefine a range (e.g., a range of ±30 degrees or a range of ±90 degrees relative to the central portion of the front surface of the electronic device 200), in which a speaker (e.g., the speaker 501 of FIG. 5) is likely to be with respect to the front surface of the electronic device 200, and a signal received within a corresponding angular range may be defined as an "in-beam signal."

The electronic device 200 may adjust a weight of an input signal for each of the microphones 210, based on the generation directions of the input signals calculated in operation 330.

In operation 340, the electronic device 200 may generate an output signal for each of the microphones 210 by reflecting the weight of the input signal for each of the microphones 210 adjusted in operation 340.

The electronic device 200 may generate an output signal for each of the microphones 210 based on whether the input signals correspond to in-beam signals based on DOA information. The electronic device 200 may determine that a signal corresponding to an in-beam signal among the generation directions of the input signals is a speaker's voice signal, and that a signal that does not correspond to an in-beam signal is an interference noise signal, not a speaker's voice signal.

For example, when it is determined in operation 330 that the input signals correspond to in-beam signals, the electronic device 200 may generate output signals for each of the microphones 210 using a scheme (e.g., filter sum beamforming (FSB)) of simply filtering and adding the input signals for each microphone without considering a weight in operation 340. Alternatively, when it is determined in operation 330 that the input signals do not correspond to in-beam signals, the electronic device 200 may adjust the weight of the input signal for each of the microphones 210, based on the generation directions of the input signals in operation 340. For example, based on the generation directions of the input signals, the electronic device 200 may correct a weight of an input signal generated in a direction other than the speaker's position corresponding to the electronic device 200 to be greater than a reference value and may correct a weight of an input signal generated in a direction corresponding to the speaker's position to be less than the reference value. The electronic device 200 may generate an output signal for each of the microphones 210 by reflecting the weight adjusted for each of the microphones 210.

The electronic device 200 may adjust the weight of the input signal for each of the microphones 210, based on the weight table 600 provided in advance for the microphones 210 corresponding to the generation directions of the input signals. The electronic device 200 may adjust a weight of an input signal of a second microphone based on a position of the second microphone, relative to the position of the speaker corresponding to the electronic device 200, in the weight table 600. A method by which the electronic device 200 adjusts a weight based on the weight table 600 will be described in more detail with reference to FIGS. 6 and 7 below.

In operation 350, the electronic device 200 may output the output signal for each of the microphones 210 generated in operation 340.

Figure 4:
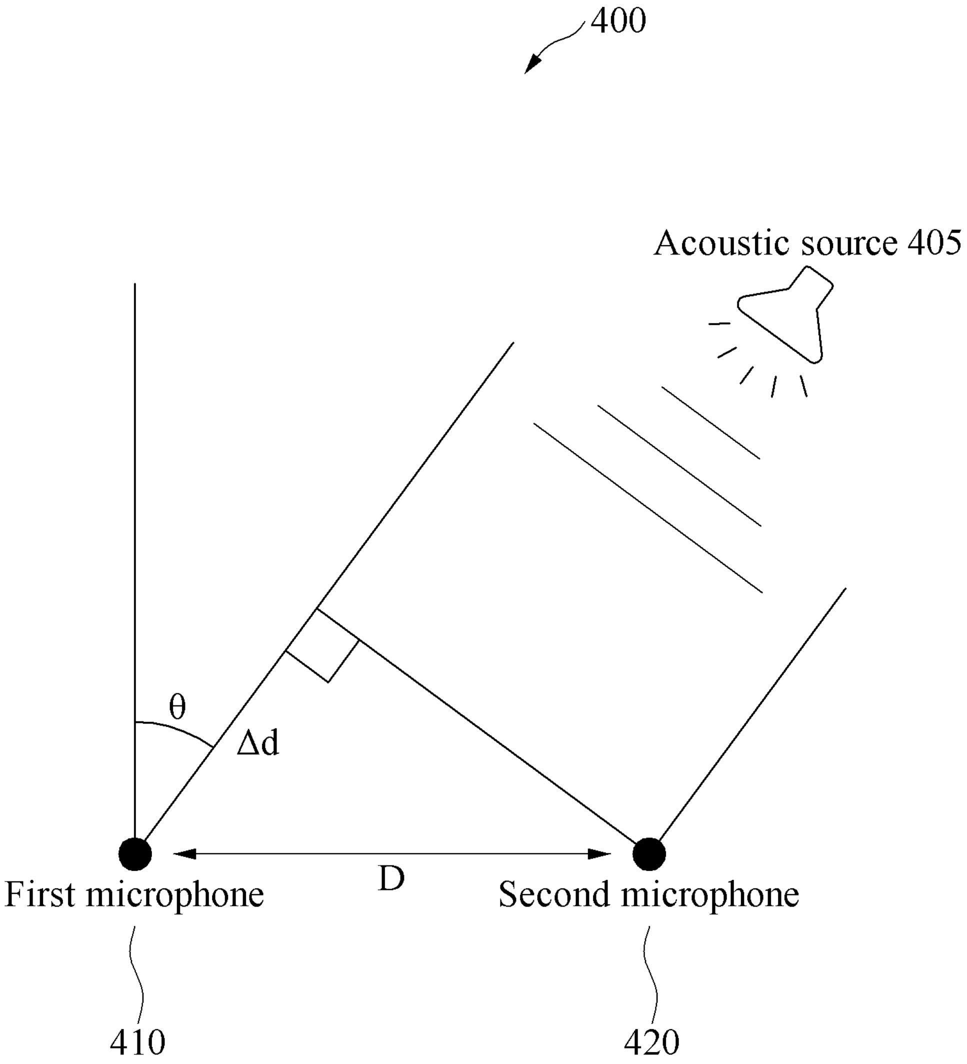
FIG. 4 is a diagram illustrating a method of calculating generation directions of input signals using direction of arrival (DOA) information, according to an embodiment.

FIG. 4 is a diagram illustrating a method of calculating generation directions of input signals using DOA information, according to an embodiment.

Referring to FIG. 4 depicting diagram 400, an angle θ [rad] corresponding to the generation direction of input signals input to microphones 410 and 420 from an acoustic source 405 according to one embodiment, a distance D [m] between the microphones 410 and 420, and an arrival path difference Δd [m] are shown.

For example, there is a difference in time for input signals transmitted from an acoustic source 405 to arrive at the microphones 410 and 420, which may cause a phase difference between input signals input to each of the microphones 410 and 420. An electronic device (e.g., the electronic device 101 of FIG. 1 and the electronic device 200 of FIG. 2) may calculate a direction (angle) of the acoustic source 405 with respect to the microphones 410 and 420 by the phase difference between the input signals arriving at the microphones 410 and 420.

A variance of the phase difference between the input signals arriving at the microphones 410 and 420 may increase as the distance D between the microphones 410 and 420 increases. In addition, the variance may increase as the angle θ from the microphones 410 and 420 to the acoustic source 405 increases.

The electronic device 200 may detect the distance D between the microphones 410 and 420 by calculating the variance of the phase difference with respect to signals input to the microphones 410 and 420 based on the above result. In this example, the phase difference with respect to the signals input to the microphones 410 and 420 may have a characteristic of being wrapped within 2π despite a linear curve, and a characteristic of approaching zero if a frequency decreases.

Accordingly, a possible linear curve representing the phase difference with respect to the signals input to the microphones 410 and 420 may be expressed, for example, as shown in Equation 1 below.

$$g_k(f)=\alpha f,$$

$$g_k(f)=\alpha f+2\pi,$$

$$g_k(f)=\alpha f-2\pi, \quad \text{Equation 1}$$

In Equation 1, $g_k(f)$ denotes a linear curve representing a k-th voice signal generated by the acoustic source 405, and a denotes a slope of the linear curve $g_k(f)$.

The electronic device 200 may calculate generation directions of input signals input to the microphones 410 and 420 from the acoustic source 405, based on the above description.

Referring to FIG. 4, the length Δd may correspond to a difference in an arrival path between a signal input to the microphone 410 and a signal input to the microphone 420.

The angle θ from the microphones 410 and 420 to the acoustic source 405 may be represented as shown in Equation 2 below.

$$\Delta d=D \sin \theta \quad \text{Equation 2}$$

The difference Δd in the arrival path may be represented as shown in Equation 3 below.

$\Delta d = Qc\ exz$ Equation 3 below.

In Equation 3, Q denotes a difference in an arrival time at which the input signals arrive at the microphones 410 and 420 and c[m/s] denotes a sound speed of a signal input to the microphones 410 and 420. When the aforementioned slope α is used, the difference Q in arrival time may be represented as $Q=\alpha/F_s$.

As a result, the electronic device 200 may calculate the angle θ corresponding to the generation direction of the input signals in the microphones 410 and 420 by the slope α.

Figure 5:
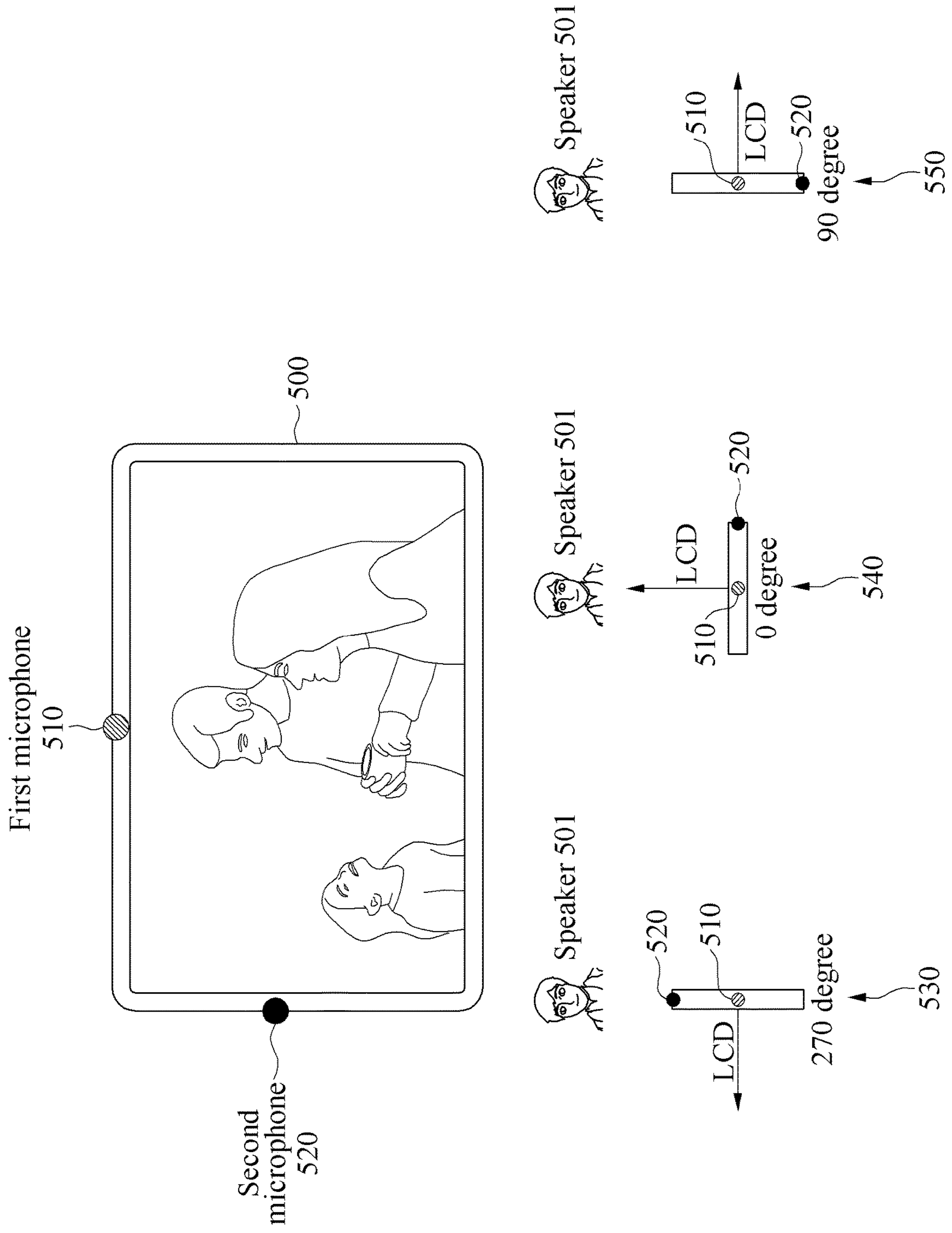
FIG. 5 is a diagram illustrating a method of generating an output signal for each microphone, according to an embodiment.

The electronic device 200 may identify positions (for example, the front surface, left/right sides, and rear surface of the electronic device 200) of microphones by an angle θ corresponding to the generation direction of the input signals, and may enhance a call quality by removing interference noise input in a direction other than a position of a speaker (e.g., the speaker 501 of FIG. 5).

FIG. 5 is a diagram illustrating a method of generating an output signal for each microphone, according to an embodiment.

Referring to FIG. 5, examples 530, 540, and 550 of various positions of the speaker 501 making a video call using an electronic device 500 (e.g., the electronic device 101 of FIG. 1 and the electronic device 200 of FIG. 2) according to one embodiment. The electronic device 500 may be, for example, a tablet or a user terminal in which landscape mode support is basic, but is not limited thereto. The electronic device 500 may include, for example, a first microphone 510 on an upper end of a front surface of the electronic device 500, a second microphone 520 on a side of the electronic device 500, and a third microphone (not shown) on a rear surface of the electronic device 500.

Since a distance between the first microphone 510 and the speaker 501 is the same as in a situation such as in each of the examples 530, 540, and 550, magnitudes of voice signals of the speaker 501 input to the first microphone 510 may also be similar. More specifically, since the first microphone 510 is at the upper end of the front surface of the electronic device 200, all signals input to the first microphone 510 may be similar when the position of the speaker 501 with respect to a liquid crystal display (LCD) screen is −90 degrees as shown in the example 530, when the position of the speaker 501 with respect to the LCD screen is 0 degrees as shown in the example 540, and when the position of the speaker 501 with respect to the LCD screen is +90 degrees as shown in the example 550. In another example, in the examples 530, 540, and 550, a distance between the second microphone 520 and the speaker 501 may vary. In this example, a signal input to the second microphone 520 may be greatly changed based on a movement position of the speaker 501.

For example, the position of the speaker 501 with respect to the LCD screen on the front surface of the electronic device 500 may be 270 degrees (−90 degrees) as shown in the example 530, may be 0 degrees as shown in the example 540, and may be 90 degrees as shown in the example 550.

When the position of the speaker 501 with respect to the LCD screen is 0 degrees as shown in the example 540, the distance between the first microphone 510 and the speaker 501 may not be significantly different from the distance between the second microphone 520 and the speaker 501, and accordingly the magnitude of the speaker 501's voice signal input to each microphone may also not significantly differ.

When the position of the speaker 501 with respect to the LCD screen is 270 degrees (−90 degrees) as shown in the example 530, the second microphone 520 and the speaker 501 may be at the shortest distance, and accordingly the speaker 501's voice signal input to the second microphone 520 may have a greatest magnitude. Alternatively, when the position of the speaker 501 with respect to the LCD screen is 90 degrees as shown in the example 550, the second microphone 520 and the speaker 501 may be at the greatest distance, and accordingly the speaker 501's voice signal input to the second microphone 520 may have a lowest magnitude. As described above, when the second microphone 520 is on the side of the electronic device 500, magnitudes of signals input to the second microphone 520 may differ in response to a change in the position of the speaker facing the front surface of the electronic device 500, which may cause a distortion of a beam pattern. The electronic device 500 may secure the robustness of the beam pattern by correcting the weight of the second microphone 520 based on, for example, a weight table (e.g., the weight table 600 of FIG. 6).

Since the position of the speaker 501 with respect to the electronic device 500 is determined based on the DOA information corresponding to each of the first and second microphones 510 and 520, the electronic device 500 may adjust the weight of the signal input to the second microphone 520 based on the generation directions of the input signals to the first and second microphones 510 and 520.

The electronic device 500 may correct a weight of an input signal generated in a direction other than the position of the speaker 501 corresponding to the electronic device 500 to be greater than the reference value, and correct a weight of an input signal generated in the direction corresponding to the position of the speaker 501 to be less than the reference value, based on the generation directions of the input signals.

The electronic device 500, for example, may adjust the weight of the input signal for each of the first and second microphones 510 and 520, based on the weight table 600 provided in advance for the first and second microphones 510 and 520 corresponding to the generation directions of the input signals.

For example, when the position of the speaker 501 with respect to the LCD screen is 0 degrees as shown in the example 540, both input signals input to the first microphone 510 and the second microphone 520 in the electronic device 500 may be generated in the direction corresponding to the position of the speaker 501. In this example, the electronic device 500 may set the weight of the input signal of the first microphone 510 to be identical to the weight of the input signal of the second microphone 520 as 45%:45% (1:1) as in the first row of the weight table 600.

When the weight ratio of the first microphone 510 and the second microphone 520 is set to be equal to 1:1, the electronic device 500 may correct the weight of the second microphone 520 to be greater or less than the reference value according to a position of the second microphone 520 relative to the speaker 501.

For example, when the position of the speaker 501 with respect to the LCD screen is 90 degrees as shown in the example 550, the electronic device 500 may correct the weight of the input signal of the first microphone 510 generated in the direction corresponding to the position of the speaker 501 to be 10%, which is less than the reference value (45%), and correct the weight of the input signal of the second microphone 520 generated in the direction other than the position of the speaker 501 to be 80%, which is greater than the reference value (45%).

In another example, when the position of the speaker 501 with respect to the LCD screen is 270 degrees (−90 degrees) as shown in the example 530, the electronic device 500 may correct the weight of the input signal of the second microphone 520 generated in the direction corresponding to the position of the speaker 501 to be less than the reference value, and may correct the weight of the input signal of the first microphone 510 generated in a direction other than the position of the speaker 501 to be greater than the reference value.

FIG. 6 is a diagram illustrating an example of a weight table according to an embodiment. FIG. 6 illustrates a weight table 600 showing various positions of a speaker 501 with respect to a screen or camera on the front surface of an electronic device (e.g., the electronic device 101 of FIG. 1, the electronic device 200 of FIG. 2, and the electronic device 500 of FIG. 5) in angles according to one embodiment.

Referring to FIG. 6, in a weight table 600, a first microphone (e.g., a first microphone 410 of FIG. 4 and a first microphone 510 of FIG. 5) may be a microphone located in the central portion of the front surface of an electronic device 500, as described above with reference to FIG. 5, and a second microphone (e.g., a second microphone 420 of FIG. 4 and a second microphone 520 of FIG. 5) may be a microphone located on the left and/or right sides of the electronic device 500. Although not shown in FIG. 5, a third microphone may be a microphone on the rear surface of the electronic device 500. The third microphone on the rear surface of the electronic device 500 may be used as a criterion for removing noise and/or securing DOA information rather than a voice signal of a speaker (e.g., the speaker 501 of FIG. 5). Since the third microphone has no significant influence on securing robustness, a weight of the third microphone may be fixed to a value (e.g., 10%) regardless of various positions of the speaker 501 and may be used.

Figure 7:
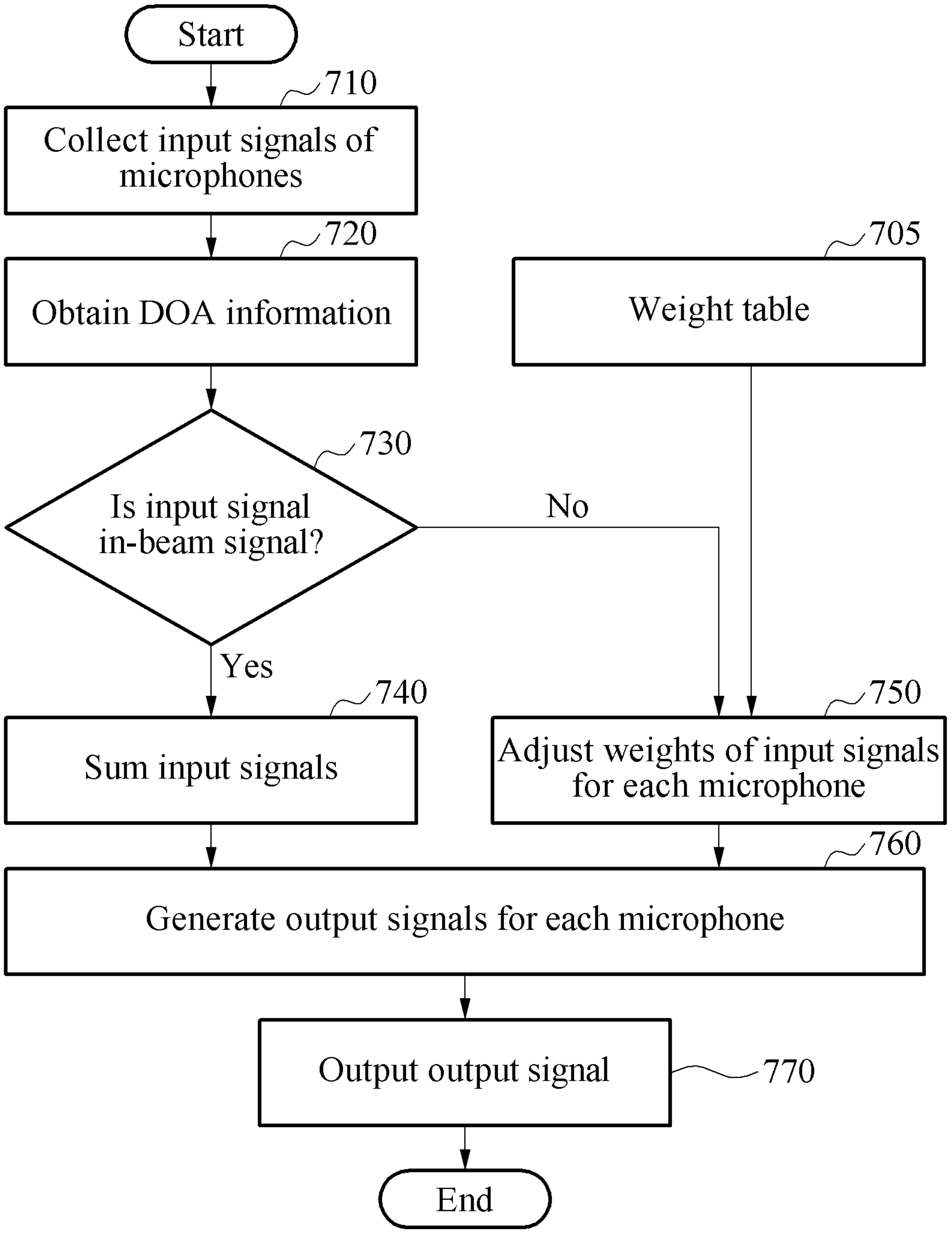
FIG. 7 is a flowchart illustrating another example of a method of operating an electronic device, according to an embodiment.

FIG. 7 is a flowchart illustrating another example of a method of operating an electronic device, according to an embodiment. In the following embodiment, operations may be sequentially performed, but are not necessarily performed sequentially. For example, the order of the operations may be changed and at least two of the operations may be performed in parallel.

Referring to FIG. 7, an electronic device (e.g., an electronic device 101 of FIG. 1, an electronic device 200 of FIG. 2, and an electronic device 500 of FIG. 5) according to one embodiment may output an output signal for each microphone (e.g., an input module 150 of FIG. 1, a plurality of microphones 210 of FIG. 2, microphones 410 and 420 of FIG. 4, and first and second microphones 510 and 520 of FIG. 5).

In operation 710, the electronic device 200 may collect input signals of the first and second microphones 510 and 520 disposed at different positions.

In operation 720, the electronic device 200 may acquire DOA information corresponding to each of the first and second microphones 510 and 520 from the input signals collected in operation 710.

In operation 730, the electronic device 200 may determine whether an input signal collected in operation 710 is an in-beam signal. The electronic device 200 may determine that a signal corresponding to an in-beam signal among the generation directions of the input signals is a speaker's voice signal and that a signal that does not correspond to an in-beam signal is an interference noise signal, which is not a speaker's voice signal. If it is determined in operation 730 that the input signal is an in-beam signal (Yes), the electronic device 200 may filter the input signals for each microphone by, for example, an FSB scheme and may perform beam forming by simply summing the input signals in operation 740, and may generate an output signal for each of the first and second microphones 510 and 520 in operation 760 based on a result of performing the beam forming in operation 740. In operation 770, the electronic device 200 may transmit and output the output signal for each of the first and second microphones 510 and 520 generated in operation 760 to the corresponding first and second microphones 510 and 520.

If it is determined in operation 730 that the input signal is not an in-beam signal (No), the electronic device 200 may adjust a weight of an input signal for each of the first and second microphones 510 and 520 in operation 750. In operation 750, the electronic device 200 may adjust a weight of an input signal for each of the first and second microphones 510 and 520 based on the weight table 705 provided in advance for microphones (e.g., a first microphone to which a first input signal is input, a second microphone to which a second input signal is input, and a third microphone to which a third input signal is input) corresponding to the generation directions of the input signals. The electronic device 200 may correct the weight of the input signal generated in the direction other than the speaker's position corresponding to the electronic device 200 to be greater than a reference value and may correct the weight of the input signal generated in the direction corresponding to the speaker's position to be less than the reference value, using the weight table 705 based on the generation directions of the input signals.

In operation 760, the electronic device 200 may generate an output signal for each of the first and second microphones 510 and 520 by reflecting the weight adjusted in operation 750.

In operation 770, the electronic device 200 may transmit and output the output signal for each of the first and second microphones 510 and 520 generated in operation 760 to the corresponding first and second microphones 510 and 520.

Figure 8:
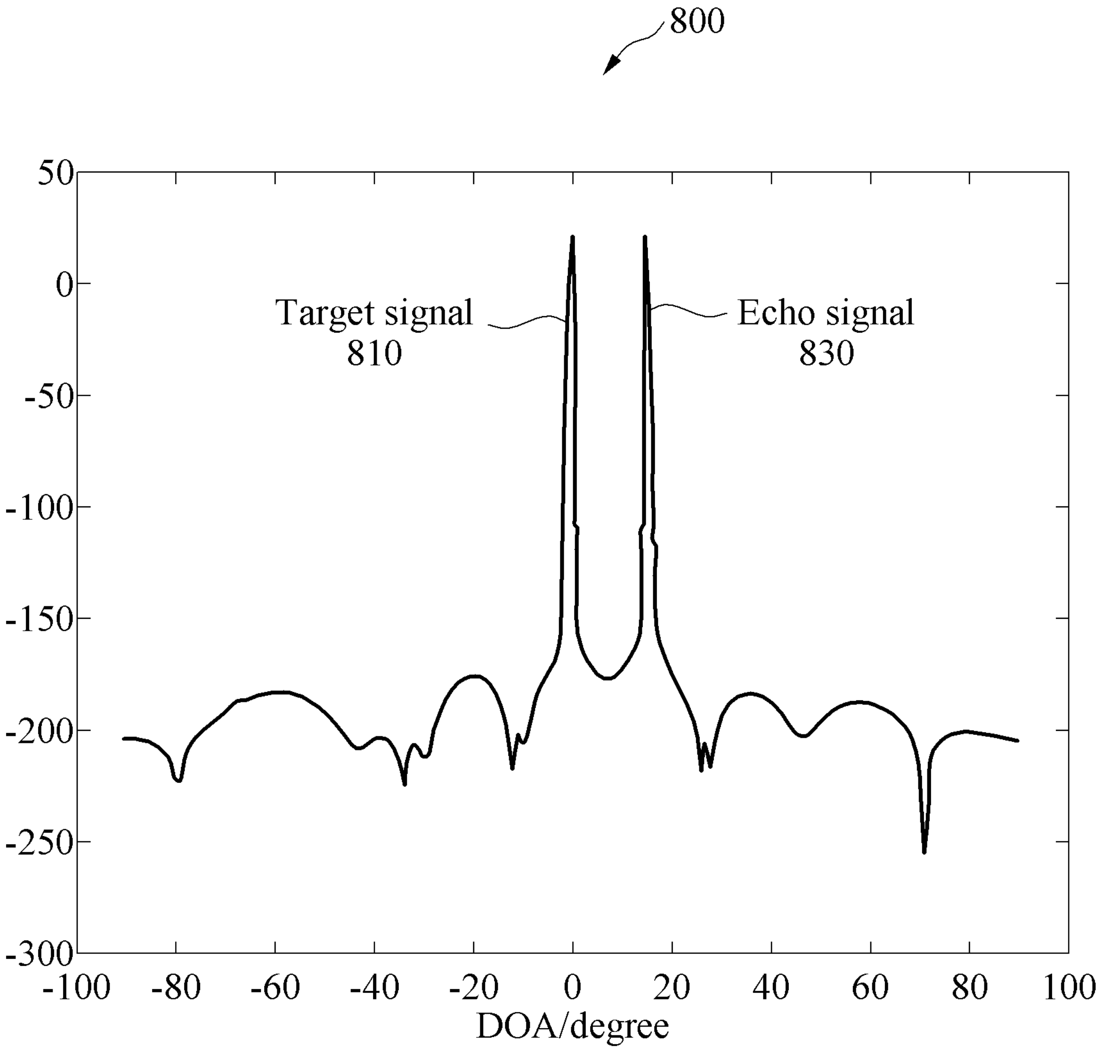
FIG. 8 is a graph illustrating an example of an echo signal according to an embodiment.

FIG. 8 is a graph illustrating an example of an echo signal according to an embodiment.

Referring to FIG. 8, a graph 800 illustrating DOA information and angles of a target signal 810 and an echo signal 830 corresponding to the target signal 810 is shown according to one embodiment.

For example, when the echo signal 830 is included in at least one input signal among input signals to microphones and when each of the microphones and the speaker is at a short distance, the echo signal 830 may be dominant in input signals to the microphones. In other words, when the echo signal 830 and a signal input from a relatively far distance compared to the echo signal 830 are input together to the microphone, it may be difficult for an electronic device (e.g., the electronic device 101 of FIG. 1, the electronic device 200 of FIG. 2, and the electronic device 500 of FIG. 5) to determine which of the signals corresponds to the echo signal 830.

In one embodiment, as shown in the graph 800, focusing on the fact that DOA information is included in the echo signal 830 and the DOA information of the echo signal 830 does not change, when a high-intensity signal is input to a microphone at a position corresponding to the DOA information of the echo signal, the DOA information of the echo signal may be removed (or lowering the weight), and only DOA information corresponding to a voice signal of a speaker (e.g., the speaker 501 of FIG. 5) may be calculated, to secure the robustness of the electronic device 200 with respect to the echo signal 830.

Figure 9:
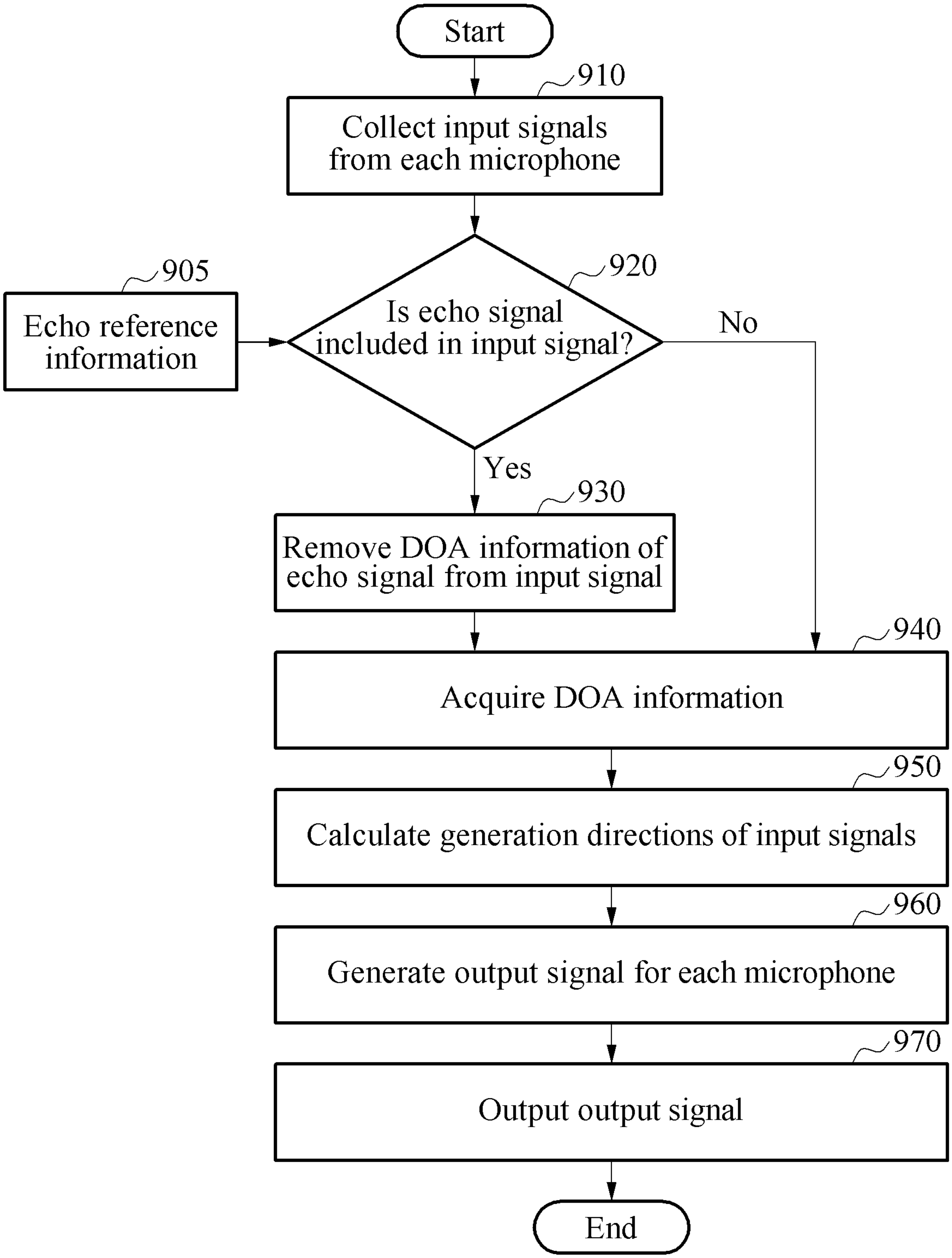
FIG. 9 is a flowchart illustrating another example of a method of operating an electronic device, according to an embodiment.

FIG. 9 is a flowchart illustrating another example of a method of operating an electronic device, according to an embodiment. In the following embodiment, operations may be sequentially performed, but are not necessarily performed sequentially. For example, the order of the operations may be changed and at least two of the operations may be performed in parallel.

Referring to FIG. 9, an electronic device (e.g., an electronic device 101 of FIG. 1, an electronic device 200 of FIG. 2, and an electronic device 500 of FIG. 5) according to one embodiment may output an output signal for each microphone (e.g., an input module 150 of FIG. 1, a plurality of microphones 210 of FIG. 2, microphones 410 and 420 of FIG. 4, and first and second microphones 510 and 520 of FIG. 5), through operations 910 to 970.

In operation 910, the electronic device 200 may collect input signals of the first and second microphones 510 and 520.

In operation 920, the electronic device 200 may determine whether an echo signal (e.g., the echo signal 830 of FIG. 8) is included in at least one of the input signals collected in operation 910. In this example, the electronic device 200 may determine whether the echo signal 830 is included in at least one of the input signals collected in operation 910 based on echo reference information 905 provided in advance.

If it is determined in operation 920 that the echo signal 830 is included in the at least one input signal (Yes), the electronic device 200 may remove DOA information of the echo signal 830 from among a corresponding input signal in operation 930, and may acquire DOA information from input signals from which the DOA information of the echo signal 830 has been removed in operation 940.

If it is determined in operation 920 that the echo signal 830 is not included in the at least one input signal (No), the electronic device 200 may acquire DOA information corresponding to each of the first and second microphones 510 and 520 from the input signals collected in operation 910, in operation 940.

In operation 950, the electronic device 200 may calculate generation directions of the input signals using the DOA information acquired in operation 940. In operation 950, the electronic device 200 may determine whether the input signals correspond to the above-described in-beam signals according to the generation directions of the input signals, may maintain a directional signal corresponding to the in-beam signal and may remove directional noise (e.g., a voice other than a speaker, and sound of a television (TV)) that does not correspond to an in-beam signal or lower a weight reflected to an input signal.

In operation 960, the electronic device 200 may generate an output signal for each of the first and second microphones 510 and 520 based on the generation directions of the input signals calculated in operation 950.

In operation 970, the electronic device 200 may transmit and output the output signal for each of the first and second microphones 510 and 520 generated in operation 960 to a corresponding microphone.

According to one embodiment, an electronic device 101, 200, 500 may include a plurality of microphones (e.g., input module 150), 210 disposed at different positions in the electronic device 101, 200, 500, a processor 120, 220 configured to collect input signals input to each of the microphones (e.g., input module 150), 210, acquire DOA information corresponding to each of the microphones (e.g., input module 150), 210 from the input signals, calculate generation directions of the input signals using the DOA information, adjust a weight of an input signal for each of the microphones (e.g., input module 150), 210 based on the generation directions of the input signals, and generate an output signal for each of the microphones (e.g., input module 150), 210 by reflecting the weight adjusted for each of the microphones (e.g., input module 150), 210, and a speaker (e.g., sound output module 155), 230 configured to output an output signal to each of the microphones (e.g., input module 150), 210.

According to one embodiment, based on the generation directions of the input signals, the processor 120, 220 may correct a weight of an input signal generated in a direction other than a position of a speaker 501 corresponding to the electronic device 101, 200, 500 to be less than a reference value, and correct a weight of an input signal generated in a direction corresponding to the position of the speaker 501 to be greater than the reference value.

According to one embodiment, the processor 120, 220 may set a weight of a first input signal for a first microphone 410, 510 at a first position among the plurality of microphones (e.g., input module 150), 210 and a weight of a second input signal for a second microphone 420, 520 at a second position different from the first position to be identical, based on the generation directions of the input signals, when both the first input signal and the second input signal are generated in the direction corresponding to the position of the speaker 501 corresponding to the electronic device 101, 200, 500.

According to one embodiment, the processor 120, 220 may adjust the weight of the input signals for each of the microphones (e.g., input module 150), 210 based on a weight table 600 provided in advance for the microphones (e.g., input module 150), 210 corresponding to the generation directions of the input signals.

According to one embodiment, the processor 120, 220 may adjust a weight of an input signal of the second microphone 420, 520 based on a position of the second microphone 420, 520, relative to the position of the speaker 501 corresponding to the electronic device 101, 200, 500 in the weight table 600.

According to one embodiment, the processor 120, 220 may determine whether an echo signal 830 is included in at least one of the input signals, and remove DOA information of the echo signal 830 from the input signal when it is determined that the echo signal 830 is included in the input signal.

According to one embodiment, the processor 120, 220 may determine whether the echo signal 830 is included in the input signal, based on echo reference information set in advance.

According to one embodiment, the echo reference information may include at least one of an input time of the echo signal 830 and DOA information of the echo signal 830.

According to one embodiment, the different positions may include a first position on an upper end of a front surface of the electronic device 101, 200, 500, a second position on a side of the electronic device 101, 200, 500, and a third position on a rear surface of the electronic device 101, 200, 500.

According to one embodiment, a method of operating an electronic device 101, 200, 500 including a plurality of microphones (e.g., input module 150), 210 may include operation 310 of collecting input signals input to each of the microphones (e.g., input module 150), 210 disposed at different positions in the electronic device 101, 200, 500, operation 320 of acquiring DOA information corresponding to each of the microphones (e.g., input module 150), 210 from the input signals, operation 330 of calculating generation directions of the input signals using the DOA information, operation 340 of adjusting a weight of an input signal for each of the microphones (e.g., input module 150), 210 based on the generation directions of the input signals, operation 350 of generating an output signal for each of the microphones (e.g., input module 150), 210 by reflecting the weight adjusted for each of the microphones, and operation 360 of outputting an output signal for each of the microphones (e.g., input module 150), 210.

According to one embodiment, the adjusting of the weight may include, based on the generation directions of the input signals, correcting a weight of an input signal generated in a direction other than a position of a speaker 501 corresponding to the electronic device 101, 200, 500 to be less than a reference value, and correcting a weight of an input signal generated in a direction corresponding to the position of the speaker 501 to be greater than the reference value.

According to one embodiment, the adjusting of the weight may include adjusting the weight of the input signal for each of the microphones (e.g., input module 150), 210 based on a weight table 600 provided in advance for the microphones (e.g., input module 150), 210 corresponding to the generation directions of the input signals.

According to one embodiment, the adjusting the weight may include adjusting a weight of an input signal of the second microphone 420, 520 based on the position of the second microphone 420, 520, relative to the position of the speaker 501 corresponding to the electronic device 101, 200, 500.

According to one embodiment, the acquiring of the DOA information may include determining whether an echo signal 830 is included in at least one of the input signals, and removing DOA information of the echo signal 830 from the input signal when it is determined that the echo signal 830 is included in the input signal.

According to one embodiment, the determining of whether the DOA information of the echo signal 830 is included may include determining whether the echo signal 830 is included in the input signal, based on echo reference information set in advance.

According to one embodiment, the echo reference information may include at least one of an input time of the echo signal 830 and DOA information of the echo signal 830.

According to one embodiment, the different positions may include a first position on an upper end of a front surface of the electronic device 101, 200, 500, a second position on a side of the electronic device 101, 200, 500, and a third position on a rear surface of the electronic device 101, 200, 500.

What is claimed is:

1. An electronic device comprising:
- a plurality of microphones disposed at different positions in the electronic device;
- a processor configured to:
  - collect input signals input to each of the microphones, acquire direction of arrival (DOA) information corresponding to each of the microphones from the input signals,
  - calculate generation directions of the input signals using the DOA information, adjust a weight of an input signal for each of the microphones, based on the generation directions of the input signals, and generate an output signal for each of the microphones by reflecting the weight adjusted for each of the microphones; and
- a speaker configured to output an output signal for each of the microphones.

2. The electronic device of claim 1, wherein the processor is further configured to, based on the generation directions of the input signals:
- correct a weight of an input signal generated in a direction other than a speaking person's position corresponding to the electronic device to be less than a reference value; and
- correct a weight of an input signal generated in a direction corresponding to the speaking person's position to be greater than the reference value.

3. The electronic device of claim 2, wherein the processor is further configured to set a weight of a first input signal for a first microphone at a first position among the plurality of microphones and a weight of a second input signal for a second microphone at a second position different from the first position to be identical, based on the generation directions of the input signals, based on both the first input signal and the second input signal being generated in the direction corresponding to the speaking person's position corresponding to the electronic device.

4. The electronic device of claim 3, wherein the processor is further configured to adjust the weight of the input signal for each of the microphones based on a weight table provided in advance for the microphones corresponding to the generation directions of the input signals.

5. The electronic device of claim 4, wherein the processor is further configured to adjust a weight of an input signal of a second microphone based on a position of the second microphone, relative to the speaking person's position corresponding to the electronic device in the weight table.

6. The electronic device of claim 1, wherein the processor is further configured to:
- determine whether an echo signal is included in at least one of the input signals; and
- remove DOA information of the echo signal from the input signal in response to determining that the echo signal is included in the input signal.

7. The electronic device of claim 6, wherein the processor is further configured to determine whether the echo signal is included in the input signal, based on echo reference information set in advance.

8. The electronic device of claim 7, wherein the echo reference information comprises at least one of an input time of the echo signal or DOA information of the echo signal.

9. The electronic device of claim 1, wherein the different positions comprise:
- a first position on an upper end of a front surface of the electronic device;
- a second position on a side of the electronic device; and
- a third position on a rear surface of the electronic device.

10. A method of operating an electronic device comprising a plurality of microphones, the method comprising:
- collecting input signals input to each of the microphones at different positions in the electronic device;
- acquiring direction of arrival (DOA) information corresponding to each of the microphones from the input signals;
- calculating generation directions of the input signals using the DOA information;
- adjusting a weight of an input signal for each of the microphones, based on the generation directions of the input signals;

generating an output signal for each of the microphones by reflecting the weight adjusted for each of the microphones; and outputting an output signal for each of the microphones.

11. The method of claim 10, wherein calculating generation directions of the input signals using the DOA information comprises:

predefining a range relative to the electronic device in which a speaking person is likely to be positioned.

12. The method of claim 11, wherein the range comprises a range of degrees relative to a central portion of a front surface of the electronic device.

13. The method of claim 10, wherein the adjusting of the weight comprises, based on the generation directions of the input signals:

correcting a weight of an input signal generated in a direction other than a speaking person's position corresponding to the electronic device to be less than a reference value; and correcting a weight of an input signal generated in a direction corresponding to the speaking person's position to be greater than the reference value.

14. The method of claim 13, wherein the adjusting of the weight comprises adjusting the weight of the input signal for each of the microphones based on a weight table provided in advance for the microphones corresponding to the generation directions of the input signals.

15. The method of claim 14, wherein the adjusting of the weight comprises adjusting a weight of an input signal of a second microphone based on a position of the second microphone, relative to the speaking person's position corresponding to the electronic device in the weight table.

16. The method of claim 10, wherein the acquiring of the DOA information comprises:

determining whether an echo signal is included in at least one of the input signals; and removing DOA information of the echo signal from the input signal in response to determining that the echo signal is included in the input signal.

17. The method of claim 16, wherein the determining of whether the DOA information of the echo signal is included comprises determining whether the echo signal is included in the input signal, based on echo reference information set in advance.

18. The method of claim 17, wherein the echo reference information comprises at least one of an input time of the echo signal or DOA information of the echo signal.

19. The method of claim 10, wherein the different positions comprise:

a first position on an upper end of a front surface of the electronic device;

a second position on a side of the electronic device; and a third position on a rear surface of the electronic device.

20. A non-transitory computer-readable storage medium storing instructions that, when executed by a processor, cause the processor to perform the method of claim 10.

* * * * *